(12) United States Patent
Roberts et al.

(10) Patent No.: US 9,386,334 B2
(45) Date of Patent: *Jul. 5, 2016

(54) METHOD AND SYSTEM FOR REMOTE CONTROL

(71) Applicant: AT&T Intellectual Property I, L.P., Atlanta, GA (US)

(72) Inventors: Linda A. Roberts, Boynton Beach, FL (US); E-Lee Chang, Mableton, GA (US); Tuck Seng Tan, McKinney, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/714,791

(22) Filed: May 18, 2015

(65) Prior Publication Data

US 2015/0256870 A1 Sep. 10, 2015

Related U.S. Application Data

(63) Continuation of application No. 13/894,194, filed on May 14, 2013, now Pat. No. 9,038,113, which is a continuation of application No. 12/882,801, filed on Sep. 15, 2010, now Pat. No. 8,453,186.

(51) Int. Cl.
| | |
|---|---|
| *H04N 21/41* | (2011.01) |
| *H04N 21/40* | (2011.01) |
| *H04N 21/422* | (2011.01) |
| *H04N 5/44* | (2011.01) |
| *H04N 21/414* | (2011.01) |
| *H04N 21/4227* | (2011.01) |
| *H04N 5/445* | (2011.01) |

(Continued)

(52) U.S. Cl.
CPC .......... *H04N 21/4126* (2013.01); *G06F 3/0482* (2013.01); *G06F 3/0485* (2013.01); *G06F 3/04883* (2013.01); *H04N 5/4403* (2013.01); *H04N 5/44582* (2013.01); *H04N 21/40* (2013.01); *H04N 21/41* (2013.01); *H04N 21/4104* (2013.01); *H04N 21/41407* (2013.01); *H04N 21/422* (2013.01); *H04N 21/4221* (2013.01); *H04N 21/4227* (2013.01); *H04N 21/42204* (2013.01); *H04N 21/42207* (2013.01); *H04N 21/42208* (2013.01); *H04N 21/42221* (2013.01); *H04N 21/42224* (2013.01); *H04N 21/47217* (2013.01); *H04N 21/482* (2013.01); *H04N 21/4852* (2013.01); *H04N 2005/443* (2013.01); *H04N 2005/4407* (2013.01)

(58) Field of Classification Search
None
See application file for complete search history.

(56) References Cited

U.S. PATENT DOCUMENTS

| | | |
|---|---|---|
| D346,805 S | 5/1994 | Kim |
| 6,447,362 B2 | 9/2002 | Khamphilavong et al. |

(Continued)

*Primary Examiner* — Justin Shepard
(74) *Attorney, Agent, or Firm* — Jackson Walker L.L.P.

(57) ABSTRACT

A method and system for remote control at a client of a multimedia content distribution network (MCDN) enables a user to configure a wireless user device as a remote control device (RCD). The RCD may communicate via a wireless network and an MCDN server to execute remote control commands at the MCDN client. The RCD may implement a remote control interface, including control elements configured for touch operation. The control elements may provide specific interactive functionality for channel selection, volume selection, playback of multimedia content, and other remote control features. The RCD may also receive feedback and status information associated with remote control commands.

18 Claims, 12 Drawing Sheets

(51) Int. Cl.
   *G06F 3/0482*   (2013.01)
   *G06F 3/0485*   (2013.01)
   *G06F 3/0488*   (2013.01)
   *H04N 21/472*   (2011.01)
   *H04N 21/482*   (2011.01)
   *H04N 21/485*   (2011.01)

(56) References Cited

U.S. PATENT DOCUMENTS

| | | |
|---|---|---|
| 6,704,040 B2 | 3/2004 | Sato |
| 6,873,824 B2 | 3/2005 | Flick |
| 7,283,808 B2 | 10/2007 | Castell et al. |
| D577,713 S | 9/2008 | Kim et al. |
| D609,221 S | 2/2010 | Kim et al. |
| 7,869,824 B2 | 1/2011 | Min |
| 7,904,041 B2 | 3/2011 | Feher |
| 7,991,935 B2 | 8/2011 | Ho |
| 2001/0055931 A1 | 12/2001 | Khamphilavong et al. |
| 2002/0021352 A1 | 2/2002 | Sato |
| 2002/0098835 A1 | 7/2002 | Flick |
| 2003/0008650 A1 | 1/2003 | Matsuyama et al. |
| 2003/0037341 A1 | 2/2003 | Van Der Meulen |
| 2004/0106427 A1 | 6/2004 | Collavo et al. |
| 2004/0110471 A1 | 6/2004 | Taniguchi |
| 2004/0203975 A1 | 10/2004 | Chen et al. |
| 2006/0135216 A1 | 6/2006 | Collavo et al. |
| 2006/0253794 A1 | 11/2006 | Wilson |
| 2007/0190995 A1 | 8/2007 | Wang et al. |
| 2007/0238481 A1 | 10/2007 | Gaucherot |
| 2007/0286587 A1 | 12/2007 | Hwang |
| 2008/0036744 A1 | 2/2008 | Hartl |
| 2008/0049147 A1 | 2/2008 | Ho |
| 2008/0057886 A1 | 3/2008 | Feher |
| 2008/0057929 A1 | 3/2008 | Min |
| 2008/0158335 A1 | 7/2008 | Baumgart |
| 2008/0235583 A1 | 9/2008 | Ostergaard et al. |
| 2009/0113478 A1 | 4/2009 | Haughawout et al. |
| 2009/0231271 A1 | 9/2009 | Heubel et al. |
| 2009/0295713 A1 | 12/2009 | Piot et al. |
| 2009/0298535 A1 | 12/2009 | Klein et al. |
| 2010/0022233 A1 | 1/2010 | Jung et al. |
| 2010/0135643 A1 | 6/2010 | Fleming |
| 2010/0269136 A1 | 10/2010 | Huang |
| 2010/0297941 A1 | 11/2010 | Doan et al. |
| 2011/0113345 A1 | 5/2011 | Choi |
| 2011/0117850 A1 | 5/2011 | Fung et al. |
| 2011/0144778 A1 | 6/2011 | Fung et al. |
| 2011/0153885 A1 | 6/2011 | Mak et al. |

METHOD AND SYSTEM FOR REMOTE CONTROL

This application is a continuation of U.S. patent application Ser. No. 13/894,194, filed May 14, 2013, issuing as U.S. Pat. No. 9,038,113 on May 19, 2015, which is a continuation of U.S. patent application Ser. No. 12/882,801, filed Sep. 15, 2010, issued as U.S. Pat. No. 8,453,186 on May 28, 2013. The entirety of each of the earlier filed applications is incorporated by reference herein.

BACKGROUND

1. Field of the Disclosure

The present disclosure relates to remote control and, more particularly, to functionality of remote control elements.

2. Description of the Related Art

Consumers are faced with a variety of devices and gadgets at their disposal, including communication devices and remote control devices. A typical consumer may possess a wireless device, such as an advanced mobile telephone capable of loading and executing application software. The consumer may desire to use the wireless device for other applications, such as remote control of a multimedia content distribution network (MCDN) terminal device.

DESCRIPTION OF THE EMBODIMENT(S)

Figure 1:
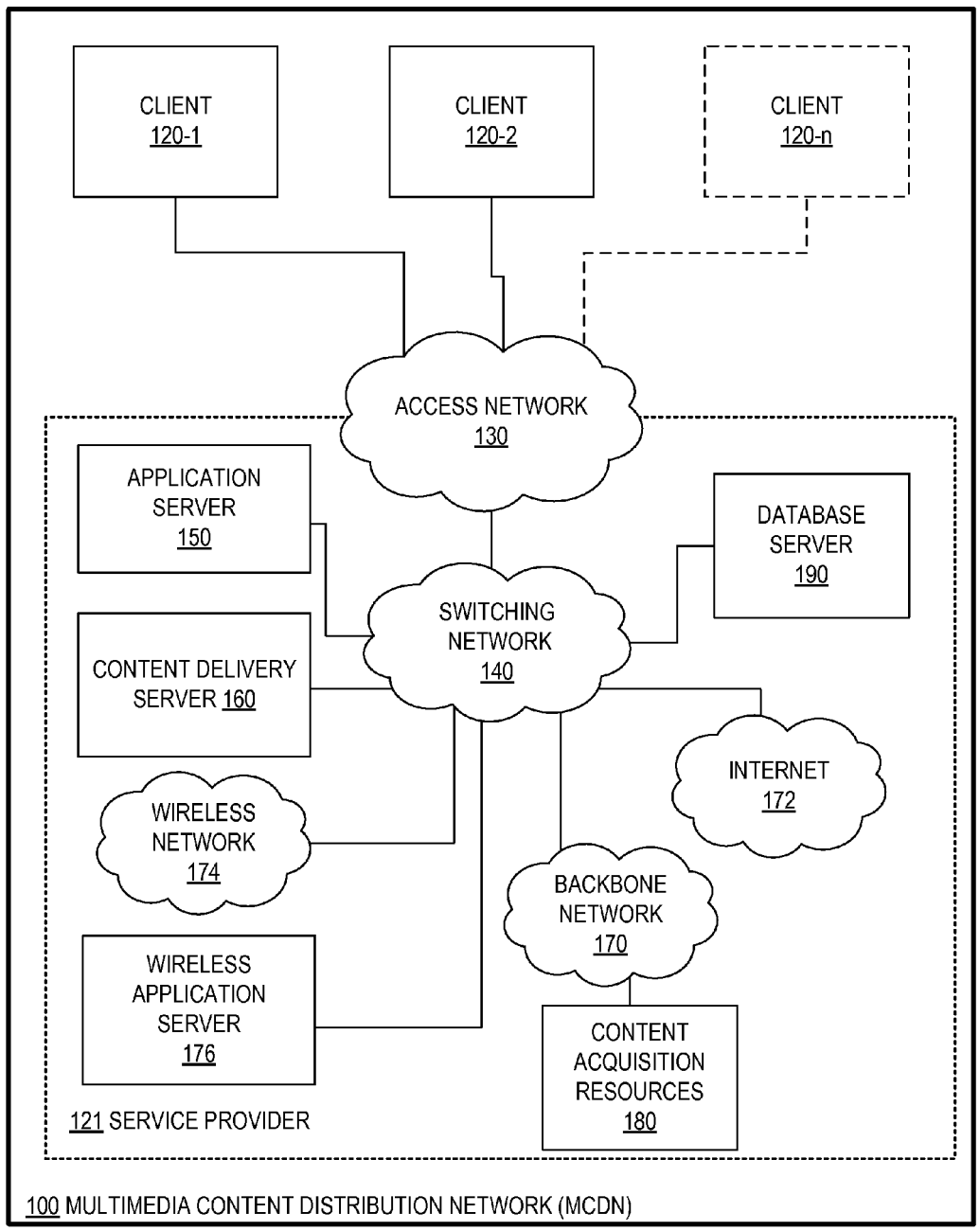
FIG. 1 is a block diagram of selected elements of an embodiment of an MCDN.

In one aspect, a disclosed method for remote control at a client of an MCDN includes establishing, by a remote control device via a wireless network, a connection to an MHD at an MCDN client. The method may further include displaying, on a display of the remote control device, a remote control interface including control elements for controlling multimedia output from the MHD, receiving user input selecting at least one of the control elements, and sending, based on the user input, a remote control command corresponding to the selected remote control element to the MHD via the wireless link and via an MCDN server. The remote control device may include a touch interface, while the user input may be received as a touch input via the touch interface.

In certain embodiments, the selected control element may be for channel selection at the MHD, while the method may further include displaying a channel bar configured for bidirectional incremental input from a zero position, and receiving the user input at the channel bar, including receiving an indication of a channel increment magnitude. Responsive to receiving the user input, the method may also include displaying, using the remote control interface, channel data that is incrementing according to the channel increment magnitude. The touch input at the channel bar may correspond to a touch and slide motion detected by the touch interface at the channel bar, while a magnitude of the slide motion may provide the indication of the channel increment magnitude. When the incrementing channel data is being displayed, the method may further include receiving a second user input for selecting currently displayed channel data, corresponding to a desired channel, and including, in the remote control command sent to the MHD, a command to display the desired channel. When an absence of the touch input is detected at the touch interface, the method may also include resetting the channel bar to the zero position.

In particular embodiments, the selected control element may be for audio volume selection at the MHD, while the method further includes displaying a volume bar configured for bidirectional input, and receiving the user input at the volume bar, including receiving an indication of a volume magnitude. Responsive to receiving the user input, the method may further include including, in the remote control command sent to the MHD, a command to modify the audio volume according to the volume magnitude. When an absence of the touch input is detected at the touch interface, the method may still further include displaying the indication of the volume magnitude on the volume bar. The user input may be a double-tap at the volume bar while the volume magnitude may be muted audio volume or zero audio volume.

In a further aspect, a disclosed wireless user device for remote control of an MHD of an MCDN includes a processor coupled to memory media, a touch interface coupled to the processor, a wireless interface coupled to the processor, and a display aligned with the touch interface and coupled to the processor. The memory media may include processor executable instructions to establish, via the wireless interface, a connection to the MHD at an MCDN client, display, using the display, a remote control interface including control elements for controlling multimedia output from the MHD, and receive, via the touch interface, user input selecting at least one of the control elements. The instructions may further be executable by the processor to send, based on the user input, a remote control command corresponding to the selected remote control element to the MHD via the wireless interface and via an MCDN server.

In particular embodiments, the selected control element may be for channel selection at the MHD, while the memory media may further include processor executable instructions to display, using the display, a channel bar configured for bidirectional incremental input from a zero position, and receive the user input at the channel bar, including receiving an indication of a channel increment magnitude. Responsive to receiving the user input, the processor executable instructions may further be executable to display, using the display, channel data that is incrementing according to the channel increment magnitude. The user input at the channel bar may correspond to a dragging motion detected by the touch interface at the channel bar. A magnitude of the dragging motion may provide the indication of the channel increment magnitude. The memory media may further include processor executable instructions to receive a second user input for selecting currently displayed channel data, corresponding to a desired channel when the incrementing channel data is being displayed. The processor executable instructions may further be executable to include, in the remote control command sent to the MHD, a command to display the desired channel. When an absence of the touch input is detected at the touch interface, the processor executable instructions may further be executable to reset the channel bar to the zero position.

In certain embodiments, the selected control element may be for audio volume selection at the MHD, while the memory media may further include processor executable instructions to display, using the display, a volume bar configured for bidirectional input, and receive the user input at the volume bar, including receiving an indication of a volume magnitude. When the user input is a double-tap at the volume bar, the processor executable instructions may be executable to set the volume magnitude to a muted audio volume or a zero audio volume. Responsive to receiving the user input, the processor executable instructions may further be executable to include, in the remote control command sent to the MHD, a command to modify the audio volume according to the volume magnitude. When an absence of the touch input is detected at the touch interface, the processor executable instructions may also be executable to display, using the display, the indication of the volume magnitude on the volume bar.

In various embodiments, the selected control element may be for navigating an electronic program guide (EPG) at the MHD, while the memory media may further include processor executable instructions to receive, via the touch interface, the user input as a motion of the selected control element within the remote control interface. The motion may be indicative of a speed of scrolling and a direction of scrolling through selectable elements in the EPG. The processor executable instructions may further be executable to include, based on the motion of the selected control element, a corresponding EPG navigation command in the remote control command sent to the MHD.

In given embodiments, the selected control element may be for controlling playback of a recorded multimedia program at the MHD, while the memory media may further include processor executable instructions to display, using the display, a playback bar configured for bidirectional incremental input from a zero position, and receive, via the touch interface, the user input at the playback bar, include receiving an indication of a playback increment magnitude. Responsive to receiving the user input, the processor executable instructions may also be executable to include, in the remote control command sent to the MHD, a command to play back the recorded multimedia program according to the playback increment magnitude.

In yet another aspect, a disclosed computer-readable memory media includes executable instructions for remote control at a client of an MCDN. The instructions may be executable to establish, by a remote control device via a wireless network, a connection to an MHD at an MCDN client, and display, on a display of the remote control device, a remote control interface including control elements for controlling multimedia output from the MHD. The processor executable instructions may further be executable to receive user input selecting at least one of the control elements, and send, based on the user input, a remote control command to the MHD via the wireless link and via an MCDN server. The remote control device may include a touch interface, while the user input may be received as a touch input via the touch interface.

In some embodiments, the selected control element is for navigating an EPG at the MHD, while the memory media may further include instructions executable to receive the user input as a motion of the selected control element within the remote control interface, and include, based on the motion of the selected control element, a corresponding EPG navigation command in the remote control command sent to the MHD. The motion may be indicative of a speed of scrolling and a direction of scrolling through selectable elements in the EPG. The motion may be a circular or a diagonal motion with respect to the remote control interface.

In certain embodiments, the selected control element is for controlling playback of a recorded multimedia program at the MHD, while the memory media may further include processor executable instructions to display a playback bar configured for bidirectional incremental input from a zero position, receive the user input at the play back bar, including receiving an indication of a playback increment magnitude, and responsive to receiving the user input, include, in the remote control command sent to the MHD, a command to playback the recorded multimedia program according to the playback increment magnitude. The indication of the playback increment magnitude may be a tap detected on the playback bar by the touch interface, while the memory media may further include processor executable instructions to, responsive to receiving the tap on a portion of the playback bar, increase the playback increment magnitude by a predetermined multiplicative factor. When the portion of the playback bar is a positive portion, the processor executable instructions may be executable to assign a positive direction to the playback increment magnitude corresponding to fast-forwarding the recorded multimedia program. When the portion of the playback bar is a negative portion, the processor executable instructions may further be executable to assign a negative direction to the playback increment magnitude corresponding to rewinding the recorded multimedia program.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of an MCDN 100. Although multimedia content is not limited to TV, video on demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital connections between clients 120 and a node (see also FIG. 4) in access network 130 while fiber, cable or another broadband medium connects service provider resources to the node. In other embodiments, the broadband cable may extend all the way to clients 120. In certain embodiments, fiber optic cables may be provided from the node in access network 130 to each individual client 120. The connections between access network 130 and clients 120 may include digital subscriber line (DSL) connections. In particular embodiments, the connections may be DSL-compliant twisted pair or another type of galvanic loop (see also FIG. 4).

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL-compliant connections, switching network 140 and/or access network 130 may include elements of a DSL access multiplexer (DSLAM) that multiplexes many subscriber DSLs to backbone network 170 (see also FIG. 4).

In FIG. 1, backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using EPG, such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include various applications (not shown in FIG. 1) that may provide functionality to clients 120.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, model identifiers for remote control devices, identifiers for peripheral devices, etc.

Also shown in FIG. 1 is wireless network 174, which may be coupled to switching network 140. Wireless network 174 may represent a wireless communications network for providing wireless service to a plurality of wireless user devices (not shown in FIG. 1). Wireless network 174 may accordingly represent an external network that is configured to operate autonomously to MCDN 100, but which may be coupled to MCDN 100. In certain embodiments, service provider 121 may own and/or operate both MCDN 100 and wireless network 174. It is further noted that wireless network 174 may be accessible at a premises of client 120, as will be described in additional detail herein.

In FIG. 1, Internet 172 is representative of any public network accessible via switching network 130. Access to Internet 172 may encompass publication of websites, web pages, and web applications that may be invoked using a universal resource locator (URL), such as an Internet web address. A web browser or similar application may be used to access a published website using an Internet user device (not shown in FIG. 1). In certain implementations, application server 150 and/or database server 190 may be configured to host web servers (not shown in FIG. 1) accessible via Internet 172, whereby the web servers provide functionality for publishing websites and managing various URLs related thereto. It is noted that websites published using MCDN 100 may provide controlled access based on an MCDN client account associated with individual client 120. Client-specific websites may thus enable client-specific information and/or communication channels to be made available by MCDN 100 via Internet 172. It is further noted that wireless network 174 may provide access to Internet 172, either independently or via switching network 140, in various embodiments.

Also shown in FIG. 1 is wireless application server 176, which may be accessed via switching network 140, and which may provide various services to enable remote control at client 120. For example, wireless application server 176 may provide executable instructions (i.e., application code) to a wireless user device in possession of a user of client 120. The executable instructions may enable the wireless user device to display a user interface for remote control, and to receive user input at the user interface. Wireless application server 176 may further manage communications from wireless network 174 to client 120. It is noted that in certain embodiments, wireless application server 176 may communicate with external entities, such as an application server (not shown in FIG. 1) associated with wireless network 174 to facilitate remote control at client 120 by a wireless user device, as will be explained in further detail herein.

Figure 2:
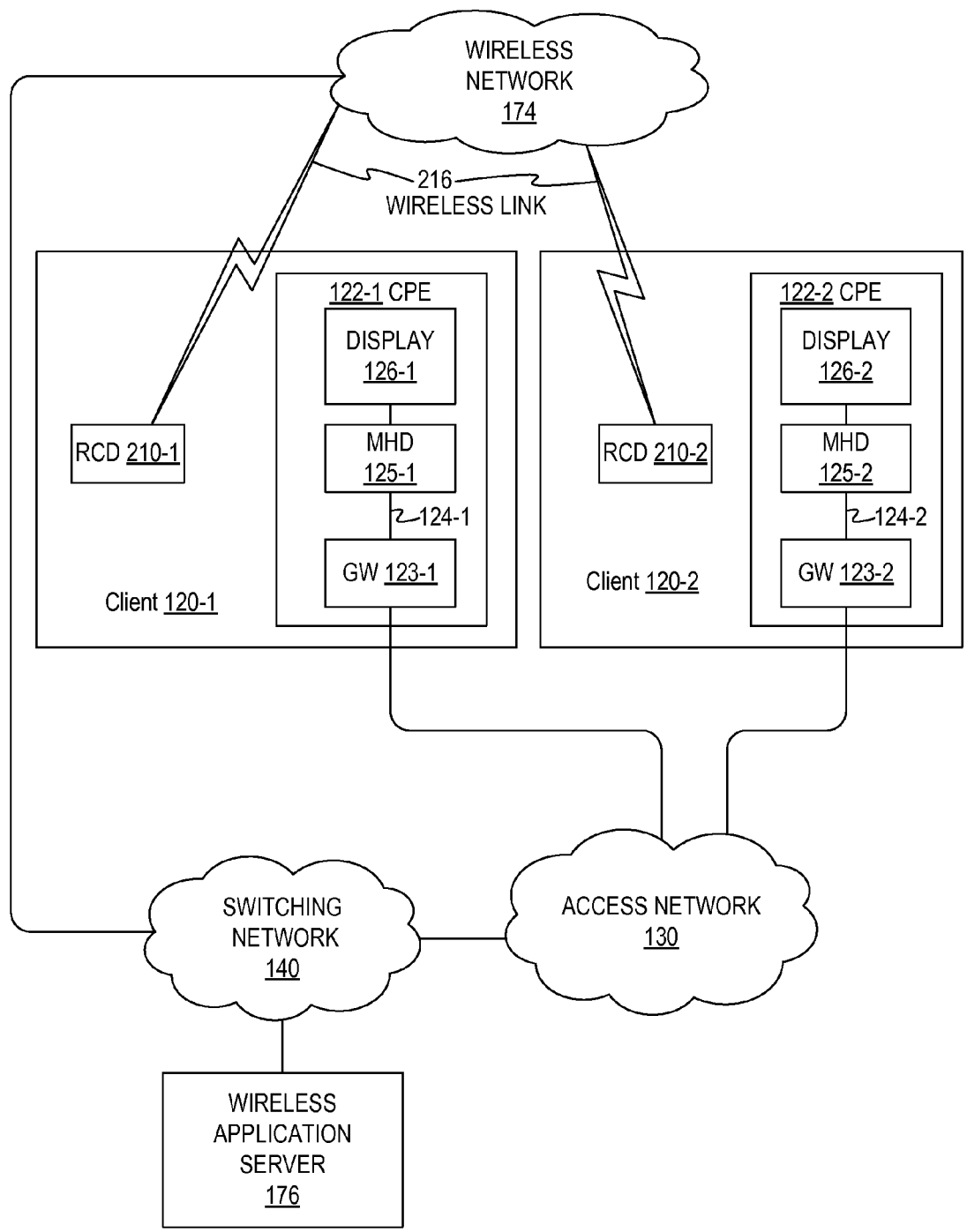
FIG. 2 is a block diagram of selected elements of an embodiment of an MCDN showing additional detail for the MCDN clients.

Turning now to FIG. 2, clients 120 are shown in additional detail with respect to access network 130. Clients 120 may include network appliances collectively referred to herein as customer premises equipment (CPE) 122. In the depicted embodiment, CPE 122 includes the following devices: gateway (GW) 123, MHD 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity for client 120 to access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard for computer monitors and/or television displays. Standards for computer monitors include analog standards such as video graphics array (VGA), extended graphics array (XGA), etc., or digital standards such as digital visual interface (DVI) and high definition multimedia interface (HDMI), among others. A television display may comply with standards such as National Television System Committee (NTSC), Phase Alternating Line (PAL), or another suitable standard. Display 126 may include one or more integrated speakers to play audio content.

MHD 125 is enabled and configured to process incoming multimedia signals to produce audio and visual signals suitable for delivery to display 126 and any optional external speakers (not depicted in FIG. 2). Incoming multimedia signals received by MHD 125 may be compressed and/or encrypted, digital or analog, packetized for delivery over packet-switched embodiments of access network 130 or modulated for delivery over cable-based access networks. In some embodiments, MHD 125 may be implemented as a stand-alone set top box suitable for use in a co-axial or IP-based MCDN.

MHD 125 may be operable to communicate requests or commands wirelessly to a dedicated remote control (not shown in FIG. 2), which may employ infrared (IR) or radio frequency (RF) signals. It is noted that MHDs 125 may also receive requests or commands via buttons (not depicted) located on side panels of MHDs 125. Clients 120 may further be configured to operate with a respective remote control device (RCD) 210, which is configured to control the operation of MHD 125 by means of a user interface (see FIGS. 10-12) displayed on RCD 210. As will be described in detail below, RCD 210 may be a wireless device, such as a mobile telephone, that is capable of executing instructions that generate the user interface and receive user input for remote control of MHD 125. In one embodiment, wireless network 174 may provide wireless network service to RCD 210 via wireless link 216. As shown in FIG. 2, wireless network 174 may be a wide-area network (WAN) that is capable of providing service to a number of clients 120, such as client 120-1 and client 120-2, which may be at different locations. Wireless network 174, in the exemplary embodiment depicted in FIG. 2, may be coupled to switching network 140 and access network 130, through which control over MHD 125 may be executed via GW 123.

Also shown in FIG. 2 is wireless application server 176, which may be accessed via switching network 140, and which may provide various services to enable RCD 210 to perform remote control of MHD 125. For example, wireless application server 176 may provide executable instructions, in the form of application code (not shown in FIG. 2, see FIG. 4), for execution by RCD 210. The application code may enable RCD 210 to generate a user interface and to receive user input for providing remote control functionality. The application code may further be configured to communicate with wireless application server 176, in response to receiving user input. It is noted that wireless application server 176 may also communicate with a third-party server, such as associated with wireless network 174 and/or with RCD 210. In certain embodiments, wireless application server 176 may be configured to support multiple or different wireless applications associated with MCDN 100.

Figure 3:
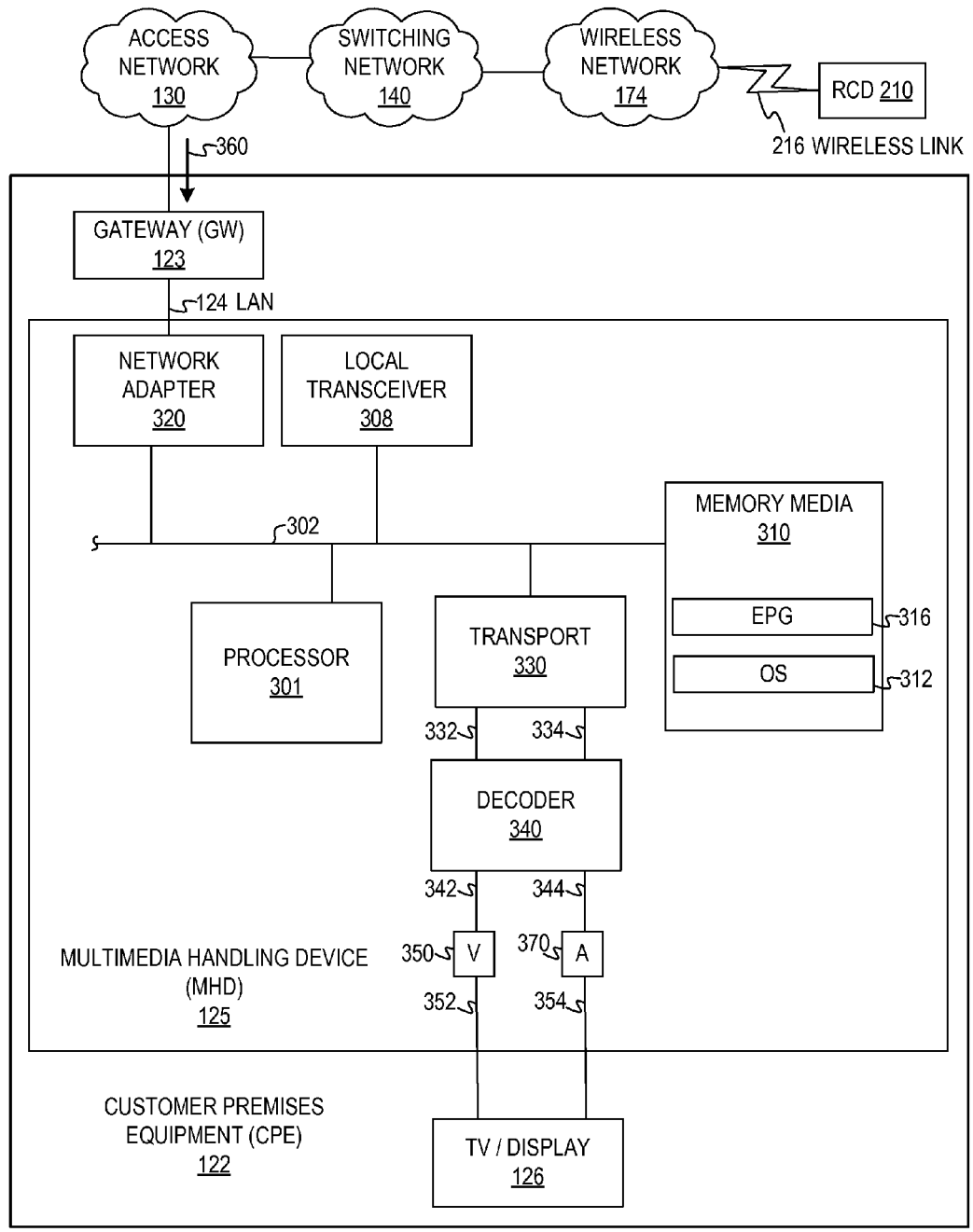
FIG. 3 is a block diagram of selected elements of an embodiment of a multimedia handling device (MHD)

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media, collectively identified as memory media 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130. Also shown is RCD 210, which may access GW 123 via wireless network 174 and switching network 140, as similarly described above with respect to FIG. 2. RCD 210 is shown accessing wireless network 174 via wireless link 216.

In embodiments suitable for use in IP-based content delivery networks, MHD 125, as depicted in FIG. 3, may include transport unit 330 that assembles the payloads from a sequence or set of network packets into a stream of multimedia content. In coaxial-based access networks, content may be delivered as a stream that is not packet-based and it may not be necessary in these embodiments to include transport unit 330. In a co-axial implementation, however, clients 120 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce analog video and audio signals 352 and 354 in a format compliant with display 126, which itself may not be a part of MHD 125.

Memory media 310 encompasses persistent and volatile media, fixed and removable media, and magnetic and semiconductor media. Memory media 310 is operable to store instructions, data, or both. Memory media 310 as shown may include sets or sequences of instructions and/or data, namely, an operating system 312, and EPG 316. Operating system 312 may be a UNIX or UNIX-like operating system, a Windows® family operating system, or another suitable operating system. In some embodiments, memory media 310 is configured to store and execute instructions provided as services to client 120 by application server 150, as mentioned previously.

EPG 316 represents a guide to the multimedia content provided to client 120 via MCDN 100, and may be shown to the user as an element of an MHD user interface on display 126. The MHD user interface may include a plurality of menu items arranged according to one or more menu layouts, which enable a user to operate MHD 125. The user may operate the MHD user interface, including EPG 316, using RCD 210 (see FIG. 2), which, as noted above, may be configured to provide a unique remote control interface.

Local transceiver 308 represents an interface of MHD 125 for communicating with external devices, such as a dedicated remote control (not shown in FIG. 3). Local transceiver 308 may provide a mechanical interface for coupling to an external device, such as a plug, socket, or other proximal adapter. In some cases, local transceiver 308 is a wireless transceiver, configured to send and receive IR or RF or other signals. In some implementations, local transceiver 308 receives IR or RF signals, but does not transmit IR or RF signals, i.e., local transceiver 308 may be a receiver. Local transceiver 308 may be accessed by a remote control module (not shown in FIG. 3) for providing remote control functionality. In some embodiments, local transceiver 308 may include WiFi functionality.

Figure 4:
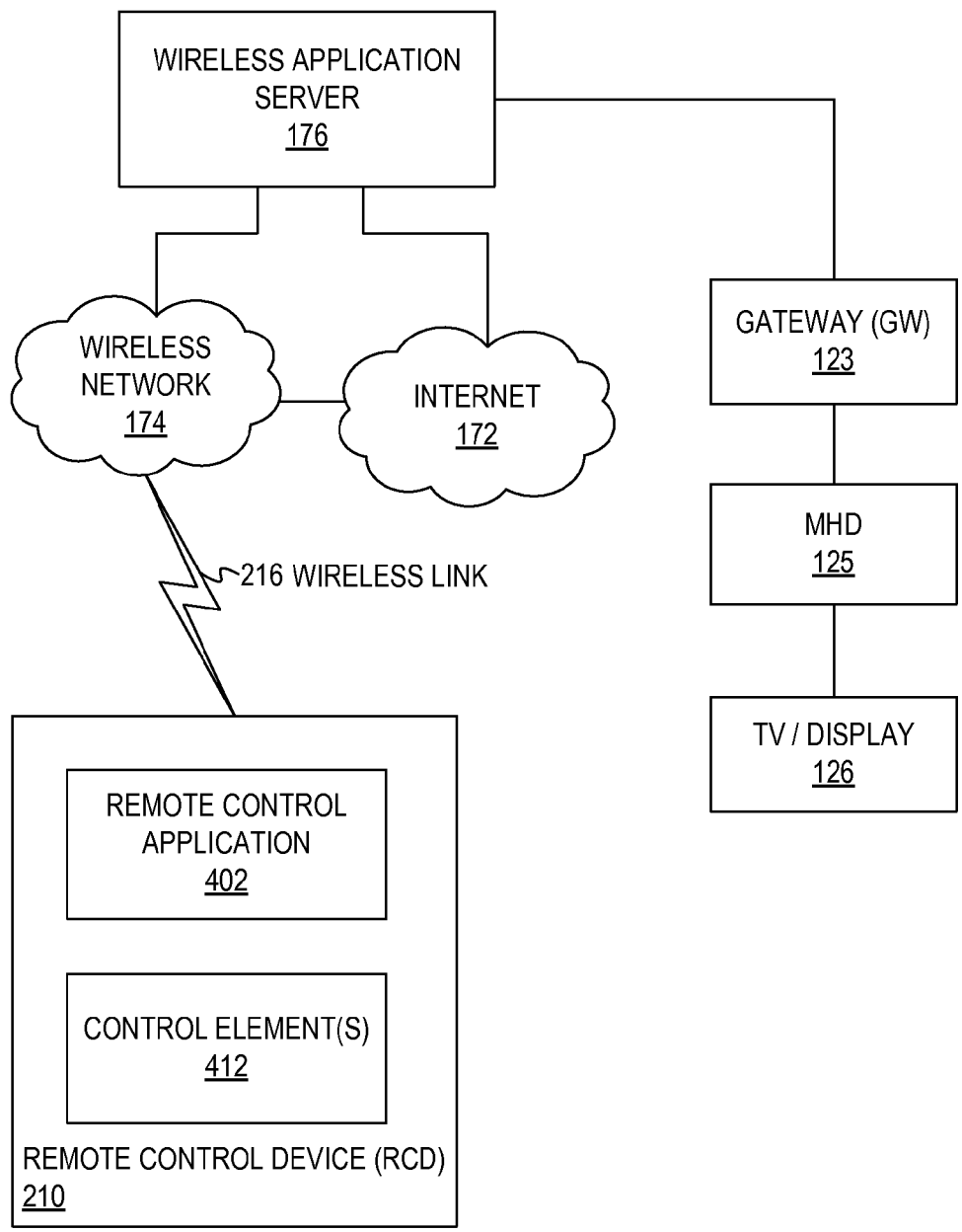
FIG. 4 is a block diagram of selected elements of an embodiment of a remote control system.

Turning now to FIG. 4, a block diagram of selected elements of an embodiment of remote control system 400 is depicted. It is noted that elements in FIG. 4 represent like-numbered elements discussed above with respect to FIGS. 1-3. Remote control system 400 may employ an exemplary architecture for remote control in conjunction with MCDN 100 (see FIG. 1), as described herein. In various embodiments, certain elements in remote control system 400 may be omitted or rearranged, as desired.

In FIG. 4, remote control system 400 is shown including display 126, MHD 125, and GW 123, which may represent certain elements of CPE 122 that are configured for use with MCDN 100 (see FIGS. 1-3). GW 123 is shown in communication with wireless application server 176, which may represent an MCDN server (see also FIGS. 1-3) that is configured to serve a large number of clients 120 and their respective users. Thus, while wireless application server 176 is shown in FIG. 4 singularly coupled to GW 123, it will be understood that this connection may be representative for multiple simultaneous connections to different GWs 123 at respectively different locations of clients 120.

As shown in FIG. 4, wireless application server 176 may be accessed via wireless network 174 and/or via Internet 172. In certain instances, wireless network 174 may directly communicate with wireless application server 176, thereby enabling RCD 210 to communicate with wireless application server 176. In different embodiments, wireless network 174 may provide access to Internet 172, through which wireless application server 176 may be configured to receive connection requests from RCD 210. As noted above, wireless network 174 may include additional servers (not shown in FIG. 4) for wireless application functionality, such as supporting remote control application 402 executing on RCD 210. Accordingly, in certain embodiments, wireless application server 176 may be configured to communicate with wireless network 174 via a server (not shown in FIG. 4) associated with wireless network 174 and/or RCD 210.

Also in FIG. 4, wireless network 174 and Internet 172 may represent elements of MCDN 100, as discussed previously (see also FIG. 1). Wireless network 174 may provide wireless service via wireless link 216 to RCD 210, which may represent a mobile telephony device, such as a cellular telephone, smart phone, or other types of devices, such as media players, music players, or network access devices. RCD 210 may also be a portable computer or a personal computer configured with wireless capability (see also FIG. 9). RCD 210 is shown including functional elements, which may represent instructions or code executable by RCD 210. Remote control application 402 may provide a user interface with unique and novel functionality, as will be described in detail below (see also FIGS. 10-12). Control element(s) 412 may represent specific data objects for receiving unique and novel forms of user input for remote control of MHD 125, as will also be described in further detail. In certain instances, remote control application 402 may generate (or include) control element(s) 412 as a portion of a user interface displayed on RCD 210. Remote control application 402 may further be configured to communicate via wireless network 174 to establish a connection with MHD 125, send commands to MHD 125 over the established connection, and receive feedback and information from MHD 125.

In operation of remote control system 400, a user (not shown in FIG. 4) of client 120 may operate MHD 125, and RCD 210, to establish a connection between remote control application 402 and MHD 125. Wireless application server 176 may also be involved in the connection, for example, by routing a connection request from remote control application 402 to MHD 125, based on an identity of the user. The identity of the user may be associated with an MCDN account that has previously been registered on behalf of the user with service provider 121 (see also FIG. 1). Information confirming the established connection, as well as status updates reflecting a current state of the connection, may be provided to RCD 210, which may display such status connection information to the user. In certain embodiments, establishing the connection may be referred to as "pairing" RCD 210 with MHD 125. It is noted that pairing may involve one of a number of MHDs 125 that are located at client 120 and/or associated with the user.

After the connection has been established, the user may operate a user interface provided by remote control application 402, including control element(s) 412, as will be described in detail below. Control element(s) 412 may provide specific functionality for selecting and/or browsing channels provided for display by MCDN 100 to MHD 125, modifying an audio volume associated with display 126, and/or controlling the replay of multimedia content on MHD 125/display 126, among other functions. In particular, control element(s) 412 may provide a range of flexible, configurable, and interactive functionality, according to the methods described herein.

Figure 5:
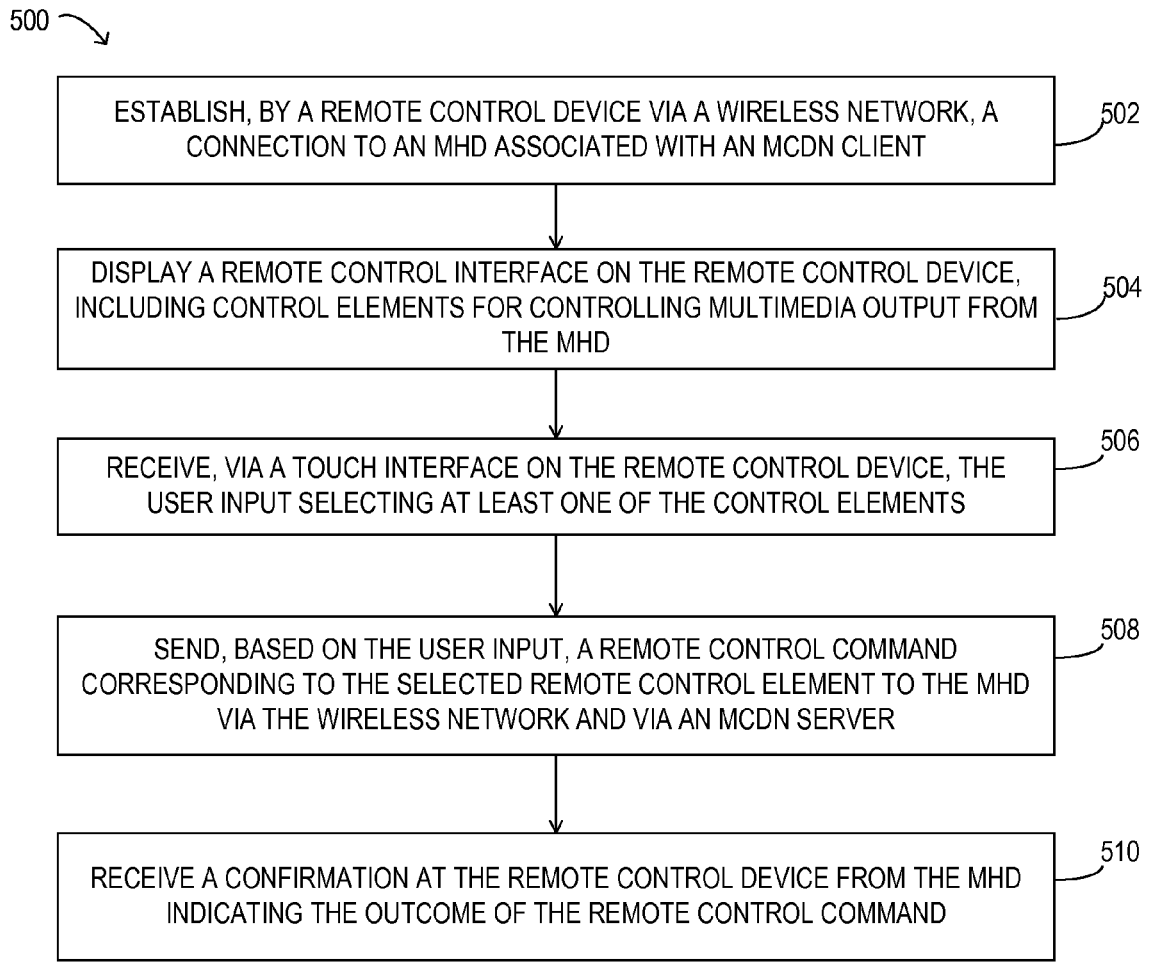
FIG. 5 illustrates selected elements of an embodiment of an interactive remote control method.

Turning now to FIG. 5, selected elements of an embodiment of a method 500 for remote control are illustrated in flow chart form. In one embodiment, method 500 may be performed by remote control application 402 (see FIG. 4) in conjunction with MCDN 100 and remote control system 400 (see FIGS. 1-4). Method 500 may also involve functionality provided by (or facilitated by) wireless application server 176 (see FIGS. 1-2 and 4). It is noted that certain operations described in method 500 may be optional or may be rearranged in different embodiments.

In method 500, a connection to an MHD associated with an MCDN client may be established (operation 502) by an RCD via a wireless network. The wireless network may provide Internet access for an Internet-based connection. An indication of the status of the connection may be displayed on the RCD. A user of the MCDN client may be authenticated and/or authorized to make the connection based on an MCDN client account. It is noted that the connection may be established at a different location than where the MHD is located, for example, at a location where the wireless network is available to the RCD. A remote control interface may be displayed (operation 504) on the RCD, including control elements for controlling multimedia output from the MHD (see also FIGS. 10-12).

Then, user input may be received (operation 506) via a touch screen interface on the RCD, such that the user input selects at least one of the control elements. In one embodiment, the control element is a sliding bar for receiving bidirectional user input from a zero position. The user input may involve activating a pointer (or slider) associated with the bar by touching, and sliding the pointer in either a positive or negative direction, which may be referred to as a "touch and slide" motion or "dragging" the pointer. A direction, speed, and/or magnitude of the sliding motion of the pointer may be interpreted as user input. The user input may further be constrained by timeouts associated with a control element. A further aspect of the user input may be attributes of the contact activating the control elements. For example, when a touch input activates the pointer, an absence of touch input may deactivate the pointer, and thereby release the control element. The control element may be configured to perform certain actions, or generate certain commands, upon release. For example, a control element may retain its last position when released. In another example, a control element may be configured to return to the zero position when released. Additional types of user input may include tapping, moving, shaking, rubbing, locking, releasing, or other types of selection and motion. The types of motion for operating a control element may include linear, curved, angled, and/or circular motion. It is further noted that the remote control interface (see FIGS. 10-12) may be responsive to various control elements, such that a hierarchy of pages or dynamical configuration of displayed control elements is accomplished. Certain control elements may provide functionality to control aspects of the remote control interface, while other control elements may provide remote control functionality associated with the MHD.

Based on the user input, a remote control command, corresponding to the selected remote control element, may be sent (operation 508) to the MHD via the wireless network and via an MCDN server. In certain embodiments, wireless application server 176 may represent the MCDN server. The selected control element may be one that provides remote control functionality for controlling the MHD, as described above. When the remote control command is sent to the MHD, the MHD may perform an action associated with the remote control command. The remote control command may reflect the intent of the user input. It is noted that operation 508 may be repeated as long as user input is being received, or in response to the user input changing over time. A confirmation may be received (operation 510) at the RCD from the MHD indicating the outcome of the remote control command. The confirmation may be displayed by the RCD. In certain embodiments, the RCD may display an indication that the confirmation was not received or that a response from the MHD indicated an error and/or issue with the remote control command. It is noted that method 500 may be practiced without operation 510.

Figure 6:
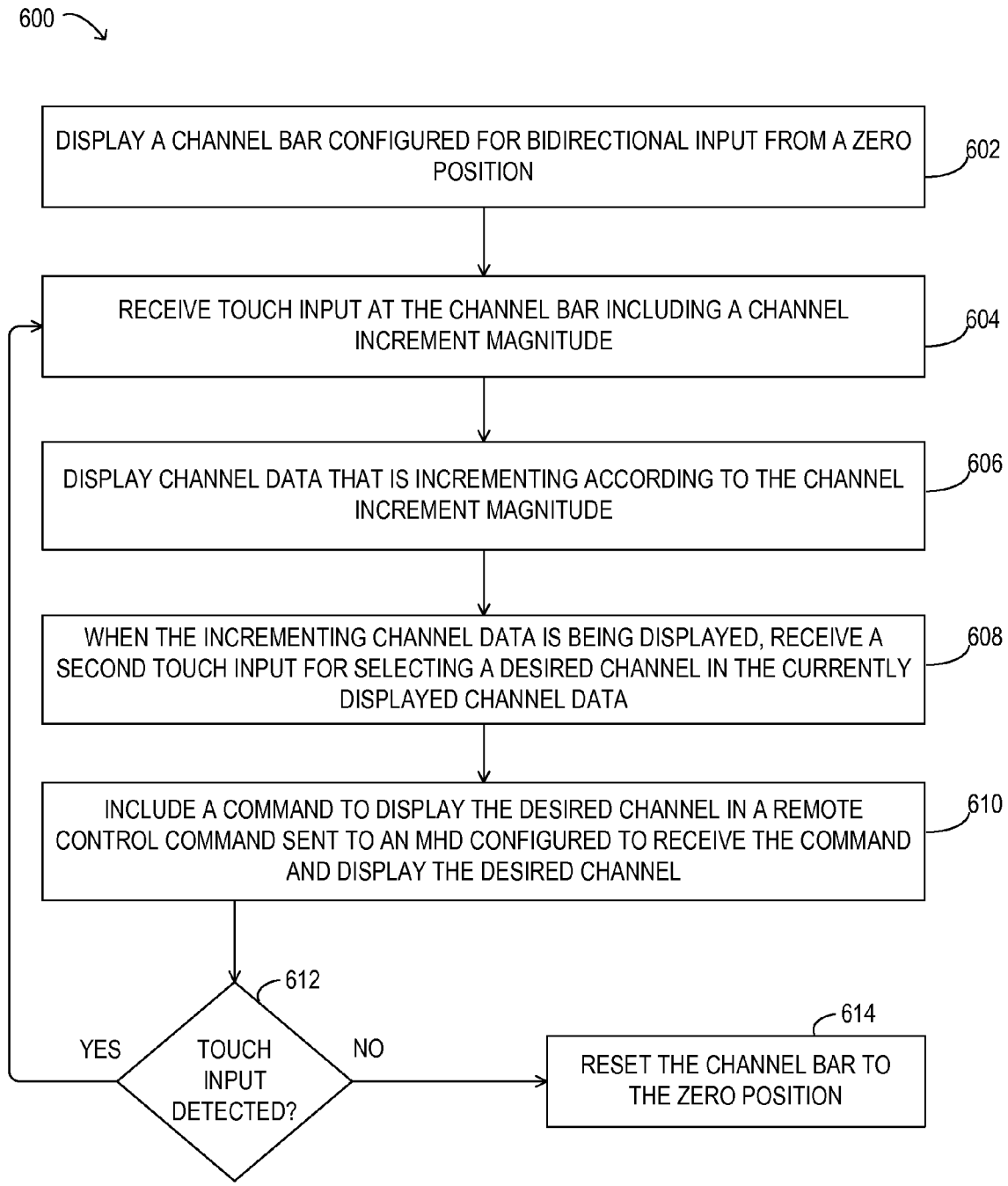
FIG. 6 illustrates selected elements of an embodiment of an interactive remote control method.

Turning now to FIG. 6, selected elements of an embodiment of method 600 for remote control are illustrated in flow chart form. In one embodiment, method 600 may be performed by remote control application 402 (see FIG. 4) in conjunction with MCDN 100 and remote control system 400 (see FIGS. 1-4). Method 600 may also involve functionality provided by (or facilitated by) wireless application server 176 (see FIGS. 1-2 and 4). It is noted that certain operations described in method 600 may be optional or may be rearranged in different embodiments.

In the depicted embodiment, method 600 displays (operation 602) a channel bar configured for bidirectional input from a zero position. The channel bar may represent a control element included in a remote control interface (see FIGS. 10-12) displayed by RCD 210 that is configured to control an output channel displayed by MHD 125. Touch input may be received (operation 604) at the channel bar, including a channel increment magnitude. The channel increment magnitude may be determined by a relative displacement of a slider of the channel bar from the zero position, while an increment polarity associated with the channel increment magnitude may be determined by the direction of the displacement relative to the zero position. Channel data that is incrementing may then be displayed (operation 606) according to the channel increment magnitude. The channel data may be displayed by RCD 210 in the remote control interface. For example, when the channel increment magnitude is a low value, the channel data may increment slowly, or in small increments. When the channel increment magnitude is a higher value, the channel data may increment faster, or in larger increments. It is noted that the channel bar may provide various scales for translating between the displacement of the slider and the channel increment magnitude, including a linear scale, a logarithmic scale, an exponential scale, a discrete scale, or an arbitrary scale, among others. The channel data may include information describing channels available for output at MHD 125.

When the incrementing channel data is being displayed, a second touch input may be received (operation 608) for selecting a desired channel in the currently displayed channel data. The second touch input may be a release or removal of a touch selection at the channel bar. The second touch input may also be a different form of touch input, such as a pressure-related touch input, a touch motion, and/or a secondary touch input, among others. The selection of the desired channel may be displayed or otherwise indicated by RCD 210, for example with an audio, haptic, or visual indication. Then, a command to display the desired channel may be included (operation 610) in a remote control command sent to an MHD configured to receive the command and display the desired channel. The remote control command may be generated for the purpose of selecting the desired channel. It is noted that a confirmation from the MHD in response to receiving the remote control command may be received (not shown in FIG. 6).

Next in method 600, a determination may be made whether additional touch input is detected (operation 612). When the result of operation 612 is YES, method 600 may loop back to operation 604. When the result of operation 612 is NO, then the channel bar may be reset (operation 614) to the zero position. In certain embodiments, the channel bar may be reset to the zero position in response to detecting an absence of touch input at the RCD. In other embodiments, operation 614 may be replaced with another action, as desired for a particular behavior of the channel bar, which may be configurable, for example, by wireless application server 176.

Figure 7:
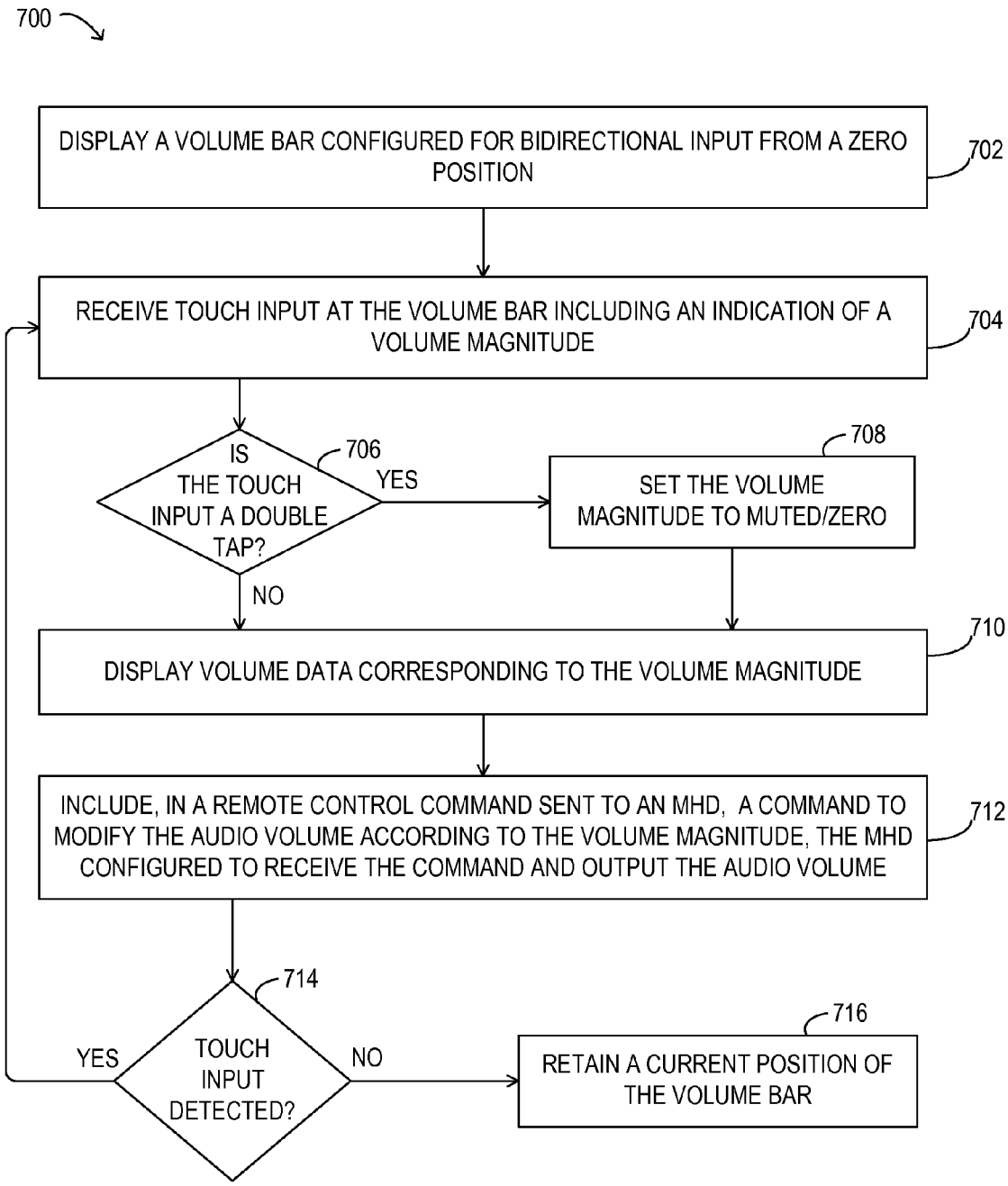
FIG. 7 illustrates selected elements of an embodiment of an interactive remote control method.

Turning now to FIG. 7, selected elements of an embodiment of method 700 for remote control are illustrated in flow chart form. In one embodiment, method 700 may be performed by remote control application 402 (see FIG. 4) in conjunction with MCDN 100 and remote control system 400 (see FIGS. 1-4). Method 700 may also involve functionality provided by (or facilitated by) wireless application server 176 (see FIGS. 1-2 and 4). It is noted that certain operations described in method 700 may be optional or may be rearranged in different embodiments.

As shown in FIG. 7, method 700 displays (operation 702) a volume bar configured for bidirectional input from a zero position. The volume bar may represent a control element included in a remote control interface (see FIGS. 10-12) displayed by RCD 210 that is configured to control audio output by MHD 125. Touch input may be received (operation 704) at the volume bar, including an indication of a volume magnitude. The indication of the volume magnitude may be determined by a relative displacement of a slider of the volume bar from the zero position. In certain cases, an increment polarity associated with the volume magnitude may be determined by the direction of the displacement relative to the zero position.

Next in method 700, a determination may be made whether the touch input is a double tap (operation 706). When the result of operation 706 is YES, the volume magnitude may be set to muted or zero (operation 708). When the result of operation 706 is NO, then method 700 may continue to operation 710, which may also occur after operation 708. Volume data may then be displayed (operation 710) corresponding to the volume magnitude. The volume data may be displayed by RCD 210 in the remote control interface. The volume data may be represented by a graphical indication of the volume magnitude. It is noted that the volume bar may provide various scales for translating between the displacement of the slider and the volume magnitude, including a linear scale, a logarithmic scale, an exponential scale, a discrete scale, or an arbitrary scale, among others. The selection of the volume magnitude may be confirmed or otherwise indicated by RCD 210, for example with an audio, haptic, or visual indication.

Then, a command to modify the audio volume according to the volume magnitude may be included (operation 712) in a remote control command sent to an MHD configured to receive the command and output the audio volume. The remote control command may be generated for the purpose of selecting the desired audio volume. It is noted that a confirmation from the MHD in response to receiving the remote control command may be received (not shown in FIG. 7).

Next in method 700, a determination may be made whether additional touch input is detected (operation 714). When the result of operation 714 is YES, method 700 may loop back to operation 704. When the result of operation 714 is NO, then the volume bar may retain (operation 716) a current position. For example, the volume bar may be reset to the zero position (or other position) in response to detecting an absence of touch input at the RCD. In other instances, operation 716 may be replaced with another action, as desired for a particular behavior of the volume bar, which may be configurable, for example, by wireless application server 176.

Figure 8:
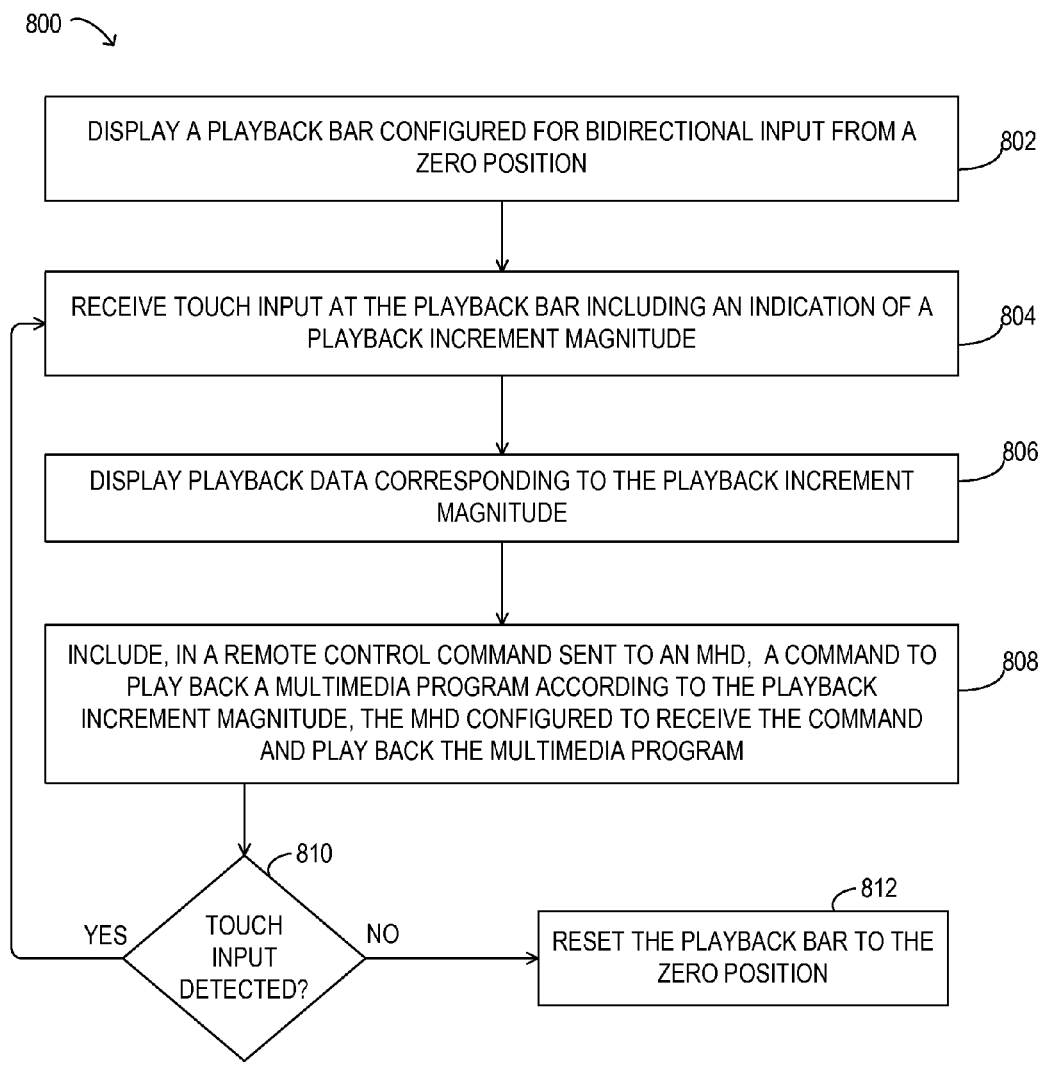
FIG. 8 illustrates selected elements of an embodiment of an interactive remote control method.

Advancing now to FIG. 8, selected elements of an embodiment of method 800 for remote control are illustrated in flow chart form. In one embodiment, method 800 may be performed by remote control application 402 (see FIG. 4) in conjunction with MCDN 100 and remote control system 400 (see FIGS. 1-4). Method 800 may also involve functionality provided by (or facilitated by) wireless application server 176 (see FIGS. 1-2 and 4). It is noted that certain operations described in method 800 may be optional or may be rearranged in different embodiments.

In the depicted embodiment, method 800 displays (operation 802) a playback bar configured for bidirectional input from a zero position. The playback bar may represent a control element included in a remote control interface (see FIGS. 10-12) displayed by RCD 210 that is configured to control playback of a multimedia program displayed by MHD 125.

Touch input may be received (operation 804) at the playback bar, including an indication of a playback increment magnitude. The playback increment magnitude may be determined by a relative displacement of a slider of the playback bar from the zero position, while an increment polarity associated with the playback increment magnitude may be determined by the direction of the displacement relative to the zero position. For example, when the playback increment magnitude is a positive value, the multimedia program may be fast forwarded, whereby the speed of fast forwarding is determined by the displacement. When the playback increment magnitude is a negative value, the multimedia program may be played in reverse (i.e., rewind), while the speed of rewinding is determined by the displacement. It is noted that the playback bar may provide various scales for translating between the displacement of the slider and the playback increment magnitude, including a linear scale, a logarithmic scale, an exponential scale, a discrete scale, or an arbitrary scale, among others. In certain instances the indication of the playback increment magnitude may be a tap detected on the playback bar by the touch interface. Responsive to receiving the tap on a portion of the playback bar, the playback increment magnitude may be increased by a predetermined multiplicative factor. When the portion of the playback bar is a positive portion, a positive direction (i.e., sign, polarity) may be assigned to the playback increment magnitude, corresponding to fast-forwarding the recorded multimedia program. When the portion of the playback bar is a negative portion, a negative direction may be assigned to the playback increment magnitude, corresponding to rewinding the recorded multimedia program. In one embodiment, additional taps on the playback bar may result in further multiplicative increases of the playback increment magnitude.

Playback data may be displayed (operation 806) corresponding to the playback increment magnitude. The playback data may be represented by a graphical indication of the playback increment magnitude. Then, a command to play back the multimedia program according to the playback increment magnitude may be included (operation 808) in a remote control command sent to an MHD configured to receive the command and play back the desired multimedia program. The remote control command may be generated for the purpose of controlling the playback of the multimedia program. It is noted that a confirmation from the MHD in response to receiving the remote control command may be received (not shown in FIG. 8).

Next in method 800, a determination may be made whether additional touch input is detected (operation 810). When the result of operation 810 is YES, method 800 may loop back to operation 804. When the result of operation 810 is NO, then the playback bar may be reset (operation 812) to the zero position. In certain embodiments, the playback bar may be reset to the zero position in response to detecting an absence of touch input at the RCD. In other embodiments, operation 812 may be replaced with another action, as desired for a particular behavior of the playback bar, which may be configurable, for example, by wireless application server 176.

Figure 9:
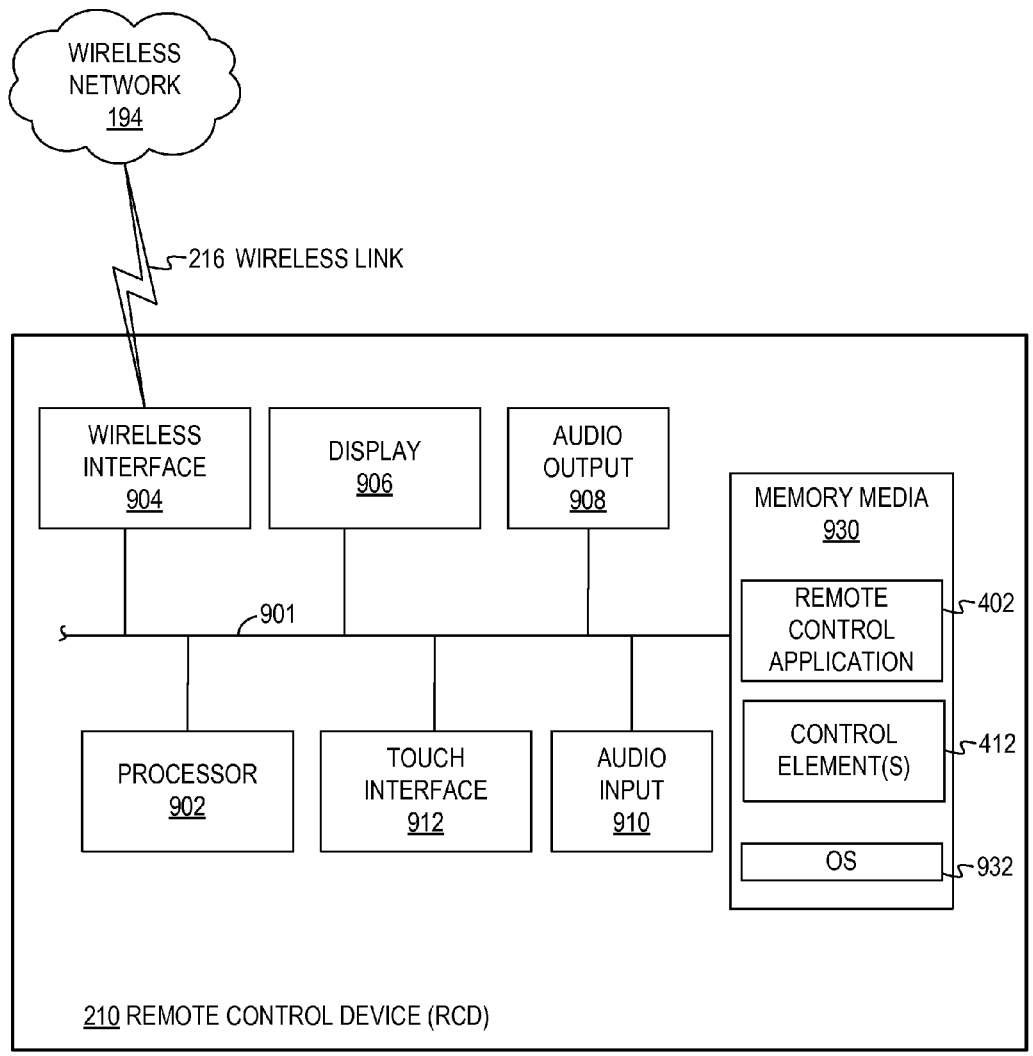
FIG. 9 is a block diagram of selected elements of an embodiment of an intercom unit.

Referring now to FIG. 9, a block diagram illustrating selected elements of an embodiment of RCD 210 is presented. As noted above, RCD 210 may represent a mobile user device with wireless communication capability. The elements of RCD 210 depicted in FIG. 7 may be physically implemented as a single, self-contained device that is portable and operable by hand by a user. As shown in FIG. 9, RCD 210 may operate in conjunction with MHD 125 (see also FIGS. 1-4) to execute the methods and operations described herein.

In the embodiment depicted in FIG. 9, RCD 210 includes a processor 902 coupled via shared bus 901 to storage media collectively identified as memory media 930. RCD 210, as depicted in FIG. 9, further includes wireless interface 904 that interfaces RCD 210 to wireless network 194 via wireless link 216, and through which RCD 210 may communicate with other elements of MCDN 100 (see FIGS. 1-4). Also shown coupled to shared bus 901 are display 906, audio output 908, audio input 910, and touch interface 912. As described herein, RCD 210 may be configured to execute remote control functionality for controlling MHD 125.

Display 906 may be implemented as a TV, a liquid crystal display screen, a computer monitor, or the like. Display 906 may comply with a display standard for computer monitors and/or television displays. Standards for computer monitors include analog standards such as VGA, XGA, etc., or digital standards such as DVI, HDMI, among others. A television display may comply with standards such as NTSC, PAL, or another suitable standard. Touch interface 912 may be co-mounted in an aligned manner with display 906, such that displayed elements, such as control element(s) 412, may be selected and/or operated using touch input by the user.

Audio output 908 may represent one or more speakers to play audio content and may, in certain instances, represent an electrical output connector for connection to an external audio device. In this manner, audio output 908 may be configured to attain certain audio effects or a desired audio quality. Similarly, audio input 910 may represent a microphone or audio transducer for capturing audio input, including speech, provided users of RCD 210.

Memory media 930 encompasses persistent and volatile storage media, fixed and removable storage media, and magnetic and semiconductor storage media. Memory media 930 is operable to store instructions, data, or both. Memory media 930 as shown may include sets or sequences of instructions, including an operating system 932, remote control application 402, and control element(s) 412 (see also FIG. 4). Operating system 932 may be a UNIX or UNIX-like operating system, a Windows® family operating system, a mobile device operating system, an embedded operating system, or another suitable operating system. It is noted that remote control application 402 may execute certain methods and operations described herein, such as portions of method 500 (see FIG. 5), method 600 (see FIG. 6), method 700 (see FIG. 6), method 800 (see FIG. 8), and/or other operations. It is further noted that control element(s) 412 may represent virtual controls, such as buttons, knobs, sliders, etc., that may be operated by users of RCD 210. In particular embodiments, control element(s) 412 include virtual control elements displayed by display 906 and operable using touch interface 912, which may include a touch sensor, a touch screen, and/or or other tactile sensor. Accordingly, control element(s) 412 may represent static as well as dynamic controls that may be reconfigured for various input and output functions, as desired.

Figure 10:
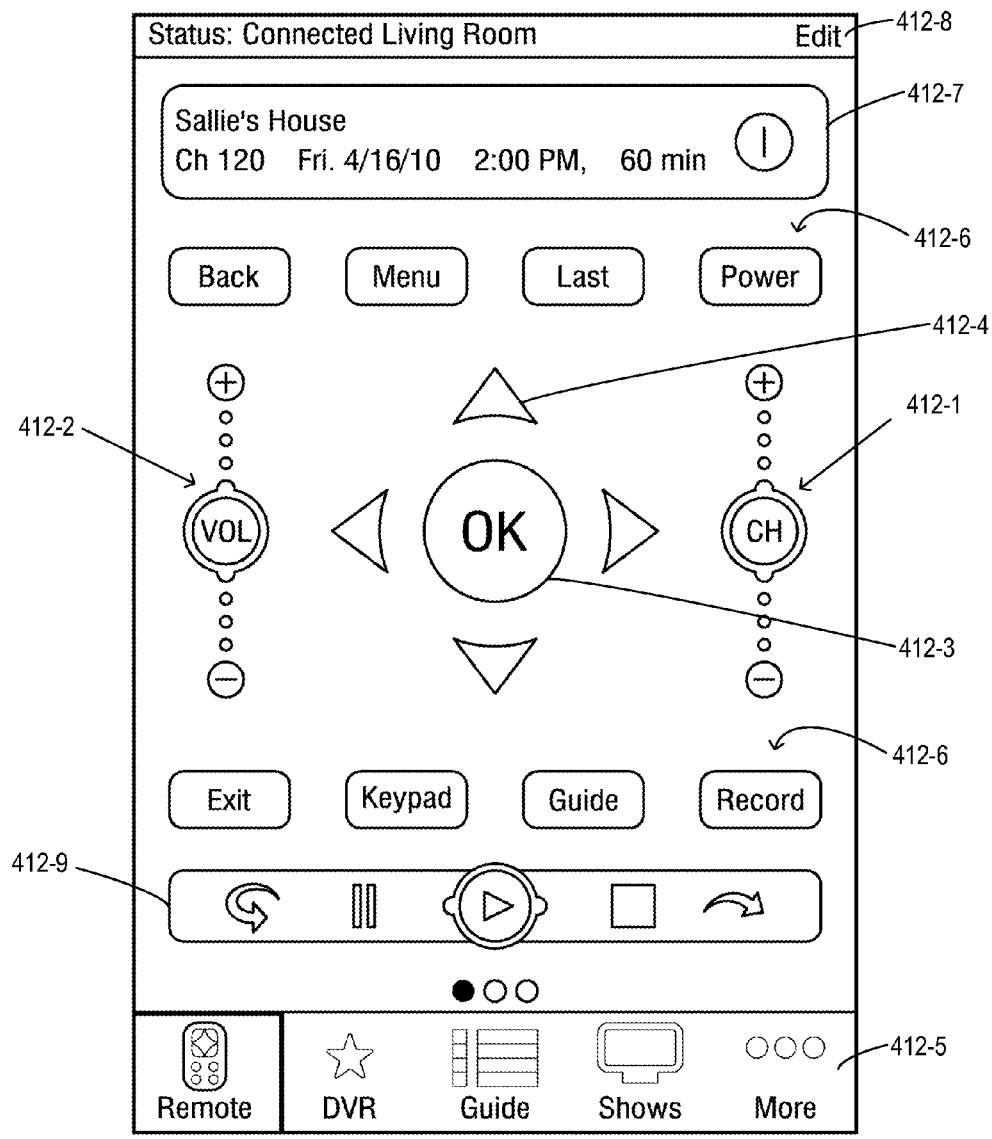
FIG. 10 illustrates selected elements of an embodiment of a user interface for remote control.

Turning now to FIG. 10, selected elements of an embodiment of remote control interface 1000-1 included with RCD 210 are illustrated. Remote control interface 1000-1 may represent a user interface that is displayed by display 906 in alignment with touch interface 912 (see FIG. 9), such that control element(s) 412 included in remote control interface 1000-1 may be operated using touch input by a user of RCD 210. It is noted that certain elements shown in remote control interface 1000-1 may be omitted or rearranged in different embodiments.

In FIG. 10, remote control interface 1000-1 is shown including channel bar 412-1, which represents a control element for scrolling or selecting an output channel displayed by MHD 125. As shown, channel bar 412-1 may include a slider along a vertical axis, which may represent a bidirectional input scale for channel bar 412-1 as mentioned previously with respect to FIG. 6. Remote control interface 1000-1 is further shown including volume bar 412-2, which represents a control element for modifying an audio volume at MHD 125. Similar to channel bar 412-1, volume bar 412-2 may include a slider along a vertical axis, which may represent a bidirectional input scale for volume bar 412-2 as mentioned previously with respect to FIG. 7.

Also shown in FIG. 10 are various control elements 412, which may display certain information and provide associated functionality. OK button 412-3, along with arrow cluster 412-4, may be used to navigate EPG 316 (see FIG. 3), as will be described below with respect to FIG. 11. Main functions 412-5 may provide a selection of a main page displayed by remote control interface 1000-1, along with corresponding functionality. Control buttons 412-6, various numbers of which may be provided in different locations, provide specific functionality for remote control. Channel data display 412-7 may provide channel data on a currently selected channel, or for incrementing channels, according to channel bar 412-1. Connection status 412-8 may display information associated with a pairing of RCD 210 with MHD 125 and enable modification or editing of a current pairing. Playback element 412-9 may provide functionality associated with playback of multimedia content at MHD 125 and, when selected, may display playback bar 1202 (see FIG. 12).

Figure 11:
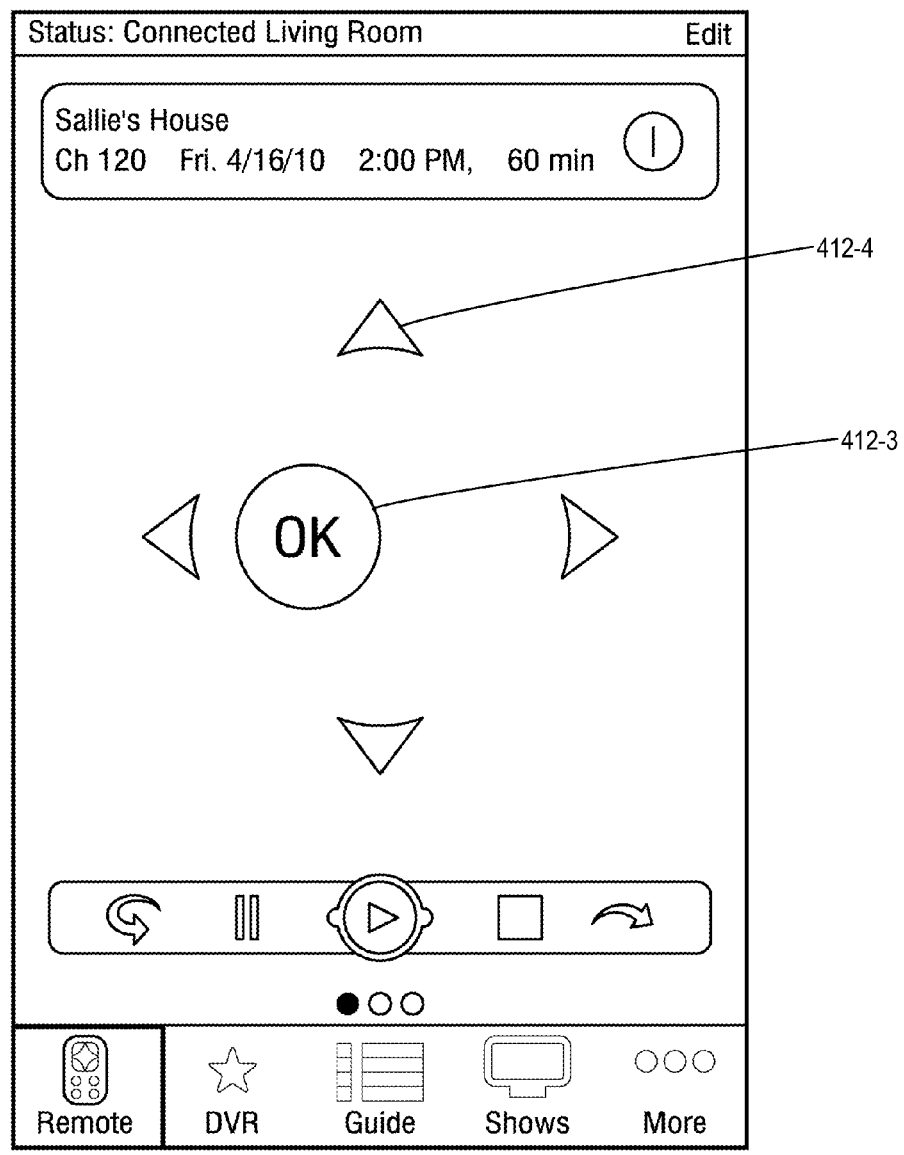
FIG. 11 illustrates selected elements of an embodiment of a user interface for remote control.

Turning now to FIG. 11, selected elements of an embodiment of remote control interface 1000-2 included with RCD 210 are illustrated. Remote control interface 1000-2 represents another state of remote control interface 1000-1 shown in FIG. 10. For example, remote control interface 1000-2 may appear when OK button 412-3 or a control button 412-6 (Guide) is selected from remote control interface 1000-1, indicating that control of EPG 316 (see FIG. 3) is desired. Arrow cluster 412-4, including four directional arrows (left, right, up, down) may be used to navigate EPG 316. Additionally, OK button 412-3 may be moved in any direction, or circularly, to navigate EPT 316. It is noted that a motion of OK button 412-3 may also be indicative of a speed of scrolling and/or a direction of scrolling through selectable elements in EPG 316.

Figure 12:
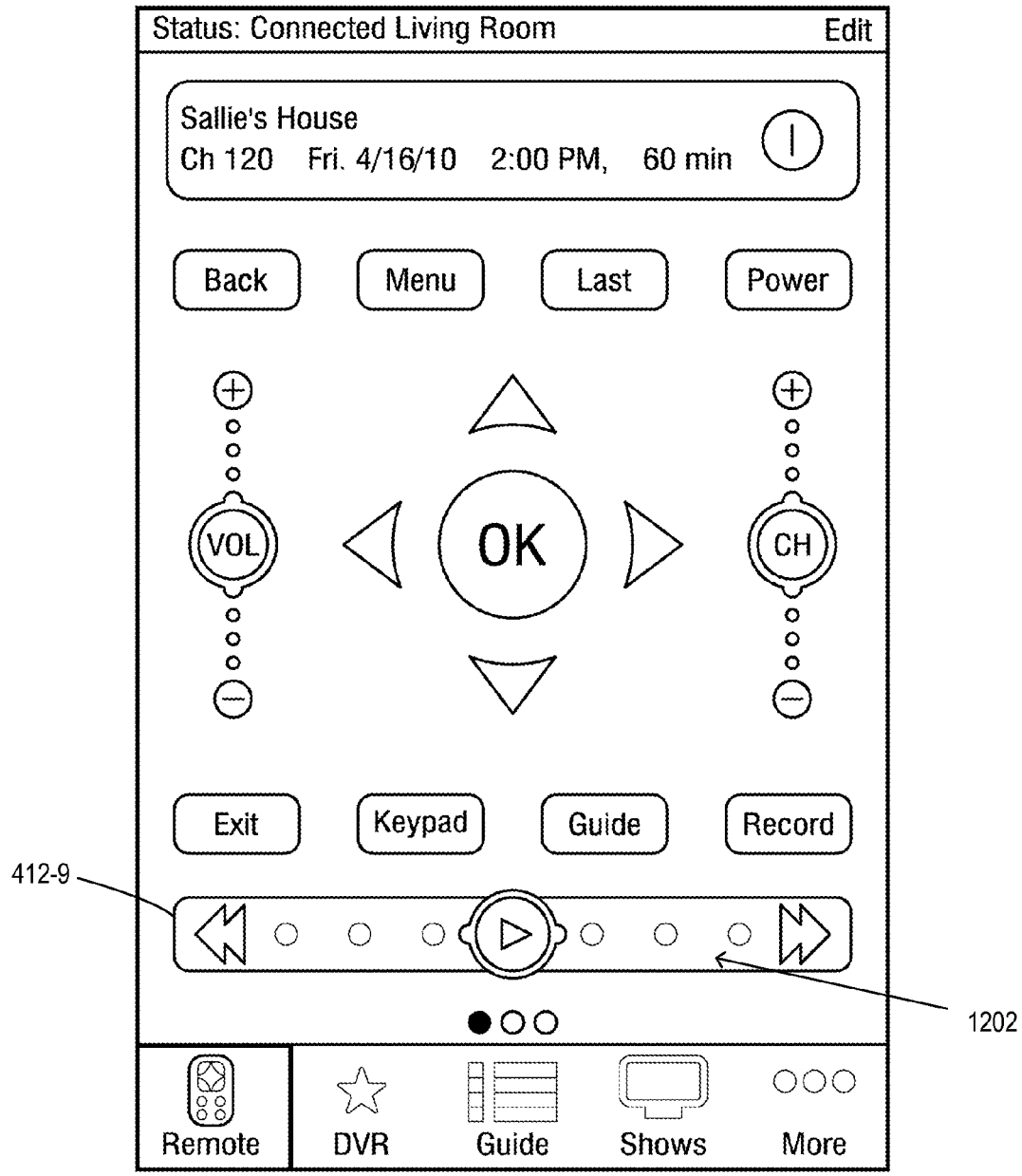
FIG. 12 illustrates selected elements of an embodiment of a user interface for remote control.

Turning now to FIG. 12, selected elements of an embodiment of remote control interface 1000-3 included with RCD 210 are illustrated. Remote control interface 1000-3 represents another state of remote control interface 1000-1 shown in FIG. 10. For example, remote control interface 1000-3 may appear when playback element 412-9 or a control button 412-6 or a main function 412-5 is selected from remote control interface 1000-1, indicating that playback of a multimedia program is desired. In remote control interface 1000-1 playback bar 1202 may represent a control element for controlling playback of a multimedia program displayed by MHD 125. As shown, playback bar 1202 may include a slider along a horizontal axis, which may represent a bidirectional input scale for playback bar 1202, as mentioned previously with respect to FIG. 8.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A remote control method, comprising:
  displaying a remote control interface comprising selectable control elements, including a volume bar, on a display;
  responsive to receiving, via the remote control interface, first user input indicative of a volume change direction and a volume change magnitude relative to a zero position of the volume bar, performing operations comprising:
    sending, to a multimedia handling device, a remote control command for changing a volume; and
    displaying, on the display, volume data that changes in accordance with the volume change magnitude; and
  responsive to receiving a second user input selecting currently displayed volume data corresponding to a desired volume, sending a command to change the volume to the desired volume.

2. The method of claim 1, wherein the first user input is indicative of a dragging motion.

3. The method of claim 1, further comprising:
  responsive to detecting, at the remote control interface, an absence of touch input for an interval exceeding a particular duration, resetting the volume bar to the zero position.

4. A wireless device, comprising:
  a processor coupled to a computer readable storage medium;
  a touch interface coupled to the processor;
  a wireless interface coupled to the processor; and
  a display coupled to the processor;
  wherein the computer readable storage medium includes processor executable instructions that, when executed by the processor, cause the processor to perform operations comprising:
    displaying a remote control interface comprising selectable control elements, including a volume bar, on the display;
    responsive to receiving, via the touch interface, first user input indicating a volume change direction and a volume change magnitude relative to a zero position of the volume bar, displaying, on the display, volume data that changes at a rate according to the volume change magnitude; and
    responsive to receiving a second user input selecting currently displayed volume data corresponding to a desired volume, sending a command to change the volume to the desired volume.

5. The wireless device of claim 4, wherein the selectable control elements include a channel control element, and wherein the operations include:
  displaying, on the display, a channel bar;
  receiving a third user input at the channel bar, including receiving an indication of a channel magnitude; and
  responsive to receiving the third user input, including, with the remote control command sent to the multimedia handling device, a channel command to select a channel according to the channel magnitude.

6. The wireless device of claim 4, wherein the operations include:
  responsive to receiving a fourth user input indicative of a double-tap at the volume bar, setting the volume magnitude to either: a muted audio volume or a zero audio volume.

7. The wireless device of claim 4, wherein the operations include:
- responsive to detecting an absence of touch input at the touch interface for an interval exceeding a predetermined duration, resetting the volume bar to the zero position.

8. The wireless device of claim 4, wherein the selectable control elements include an electronic program guide element, and wherein the operations include:
- receiving, via the touch interface, program guide user input indicative of a motion of the electronic program guide element, wherein the motion is indicative of a speed of scrolling and a direction of scrolling through selectable elements in the electronic program guide; and
- including, based on the motion of the electronic program guide element, a corresponding electronic program guide navigation command with the remote control command sent to the multimedia handling device.

9. The wireless device of claim 4, wherein the operations include:
- responsive to receiving third user input for controlling playback of a recorded multimedia program at the multimedia handling device, displaying a playback bar configured for bidirectional incremental input from a zero position;
- receiving, via the touch interface, playback bar user input indicative of a playback increment magnitude; and
- responsive to receiving the playback bar user input, including, with the remote control command sent to the multimedia handling device, a command to play back the recorded multimedia program according to the playback increment magnitude.

10. A non-transitory computer readable storage medium, including processor executable instructions that, when executed by a processor, cause the processor to perform operations comprising:
- establishing a wireless connection to a multimedia handling device;
- generating a remote control interface, including a volume bar, to indicate bidirectional incremental input from a zero position;
- receiving first user input corresponding to a dragging motion detected by a touch interface at the volume bar, wherein a magnitude of the dragging motion indicates a volume increment magnitude;
- generating a volume indicator display changing at a rate according to the volume increment magnitude; and
- responsive to receiving a second user input, selecting a desired volume indicated by a currently displayed value of the volume indicator, sending a volume change command to change the volume to the desired volume.

11. The computer readable storage medium of claim 10, wherein the operations include:
- resetting the volume bar to the zero position when an absence of touch input associated with the touch interface is detected for an interval exceeding a particular duration.

12. The computer readable storage medium of claim 10, wherein the operations include:
- sending the remote control interface to a display of a remote control device.

13. The computer readable storage medium of claim 10, wherein the operations include:
- receiving, via the touch interface, a program guide user input selecting a remote control element for navigating an electronic program guide; and
- sending an electronic program guide navigation command to a remotely located multimedia handling device.

14. The computer readable storage medium of claim 13, wherein the program guide user input is indicative of a scrolling speed associated with elements in the electronic program guide.

15. The computer readable storage medium of claim 10, wherein the dragging motion includes a circular motion.

16. The computer readable storage medium of claim 10, wherein the operations include:
- receiving, via the touch interface, a playback input selecting a remote control element for controlling playback of a recorded multimedia program stored on the multimedia handling device;
- displaying a playback bar for bidirectional incremental input from a zero position;
- receiving touch input at the playback bar indicating a playback increment magnitude; and
- sending a playback remote control command to the multimedia handling device, to play back the recorded multimedia program according to the playback increment magnitude.

17. The computer readable storage medium of claim 16, wherein the operations include:
- responsive to detecting a tap of the playback bar, determining a tapped position of the playback bar and increasing the playback increment magnitude in accordance with a playback factor determined based on the tapped position.

18. The computer readable storage medium of claim 17, wherein the operations include:
- responsive to determining the tapped position is a positive portion, assigning a positive direction to the playback increment magnitude; and
- responsive to determining the tapped position is a negative portion, assigning a negative direction to the playback increment magnitude.

* * * * *